Figure 1:
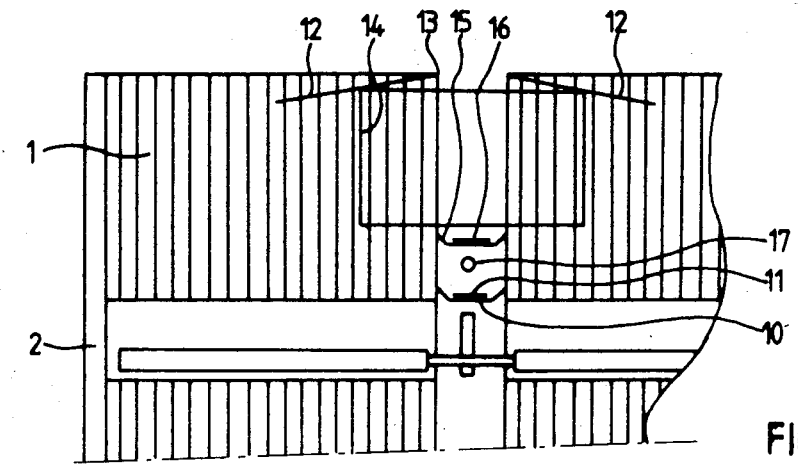
Figure 1:
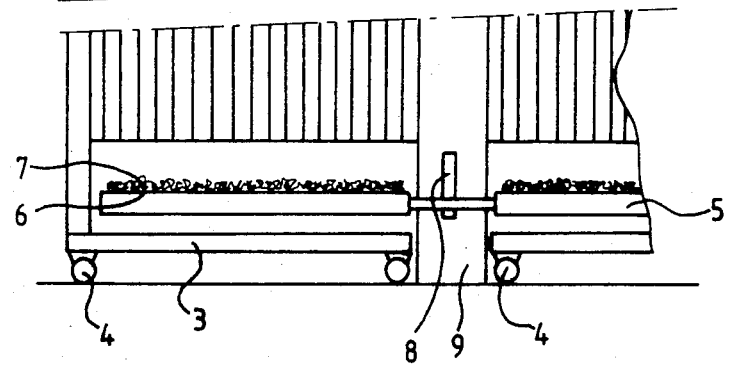

United States Patent [19]

Malestein

[11] Patent Number: 4,697,548
[45] Date of Patent: Oct. 6, 1987

[54] DEVICE AND METHOD FOR KEEPING ANIMALS

[76] Inventor: Teus Malestein, Stationsweg 49, 3771 VC Barneveld, Netherlands

[21] Appl. No.: 803,958

[22] Filed: Dec. 3, 1985

[30] Foreign Application Priority Data

Dec. 7, 1984 [NL] Netherlands .................... 8403730

[51] Int. Cl.⁴ .............................................. A01K 31/00
[52] U.S. Cl. .......................................... 119/22; 119/17; 119/18
[58] Field of Search .................. 119/17, 18, 22, 45, 119/48

[56] References Cited

U.S. PATENT DOCUMENTS

| 2,536,621 | 1/1951 | Arnold | 119/45 R X |
| 2,604,874 | 7/1952 | Forbes et al. | 119/21 X |
| 3,465,722 | 9/1969 | Duff | 119/18 |
| 4,020,793 | 5/1977 | Morrison | 119/18 |
| 4,364,332 | 12/1982 | Smith | 119/48 |

FOREIGN PATENT DOCUMENTS 978037  11/1975  Canada ...................... 119/18

Primary Examiner—John J. Wilson
Attorney, Agent, or Firm—Larson and Taylor

[57] ABSTRACT

A device for keeping animals having a row of cages (1) and an excrements disposal belt (6) below this row, the belt being the floor of the cages, the height position of the cages being adjustable with respect to said cages and in case the animals are laying hens laying nests (14) being provided in the upper parts of said cages, the cages and laying nests preferably being movable with respect to each other.

11 Claims, 2 Drawing Figures

DEVICE AND METHOD FOR KEEPING ANIMALS

The invention relates to a device for keeping animals, provided with a number of cages located in a row, an excrements disposal belt being located below them.

Such devices for keeping animals are broadly known. Generally therewith a netting or gridlike bottom is used, on which the animals live. Then the excrements disposal belt is located below the bottom.

When using such a device for broilers in practice brest blisters and leg deformations will occur. Specially brest blisters lower the value of the broilers in a high degree because the brest flesh has a high selling value. For that reason broilers in practice are mainly kept on the floor and application of a device as depicted above occurs only on a small scale notwithstanding the fact that important advantages could be obtained therewith with respect to intensive use of the floor area and possibilities of automation.

When broilers are kept on the floor it is usual that during their whole raising period they live on the same litter, which then toward the end of this period is strongly polluted with excrements and may be moist, which also may cause brest blisters, may it be in a smaller degree than with netting bottoms.

When laying hens are kept in a device as depicted above occurrence of brest blisters has no or small economic interest, because hens, after they have finished laying will be sold as hen for soup or suchlike purpose, in which case brest blisters have little influence on yield.

A disadvantage of the known device as well for broilers as for laying hens is that on a netting bottom they cannot indulge their need to scratch.

The invention aims to oppose the above indicated disadvantages. Accordingly it is provided according to the invention, that the excrements disposal belt forms the bottom of the row of cages.

It is pointed to the fact that the invention means an important step forward when keeping animals in a so-called animal friendly way and that therewith in each case the well-being of the animals is met in a considerable degree. The invention attains these results and the sketched economical advantages without the need that the cost-price of the device has to become higher, it being even possible to come to a cheaper device when applying the invention.

An important advantage of the invention is, that it is possible to bring litter on the excrements disposal belt, which can simply be removed or replaced by having the belt moving.

A further important advantage of the invention is, that therewith it is possible to increase in a predetermined battery of cages the space which is available for the animals in dependence of their growth.

Accordingly it is provided according to the invention that the height position of the excrements disposal belt is adjustable with respect to the cages. Therewith it is pointed to it that when the animals are still small, the cages will have amply sufficient height. When now, in the degree the animals grow, the remaining cage is moved upwardly with respect to the excrements disposal belt or vice versa, the animals will get more height to their disposal in the degree they come bigger, wherewith bigger animals nevertheless cannot pass between the lower edge of the cages and the excrements belt.

When applying the invention movement of the excrements belt, which of course only will happen with relatively large intervals, lets move it below the animals. With a small velocity of movement the animals can then walk against the movement of the belt and generally will learn this very soon.

The invention has special advantages when applying it for laying hens. These hens are generally kept in cages having a tilted bottom, because the eggs have to be able to roll down along the tilting bottom towards an egg removal belt. This discomfort of a tilting bottom nevertheless doe not eliminate the disadvantage that laying has to occur on a polluted bottom.

Therefor the invention provides according to a further elaboration, that the cages are connected to a row of laying nests.

Preferably therewith it is provided that from two parallel rows of cages connections exist with laying nests in a row.

The embodiment of the invention with laying nests has not only the advantages, that no tilting bottom is necessary, but also that the laying hens will behave more quiet, wherewith a laying nest mostly is attractive, especially when it is located above the floor and little or not illuminated.

According to a further elaboration of the embodiment with laying nests it is provided, that the row laying nests is arranged between two rows of cages, a plurality of laying nests being open toward the one row of cages and closed with respect to other row of cages and the remainder of the laying nests of their row being open toward the other row of cages and closed toward the one row of cages.

Herewith the distance between two rows of cages is used very effectively, one obtains a surveyable construction and it is prevented that laying hens from the one row of cages can come toward the other one.

Preferably it is provided, that the laying nests of a row cooperate with an egg removal belt.

It is pointed to it, that also with cages, wherewith still a netting above the excrements disposal belt is present, application of separate laying nests with an own egg removal may mean an important improvement. Accordingly another aspect of the invention provides a device for keeping laying hens, provided with a row of cages, which is characterized in that the cages are provided with separate laying nests, which cooperate with an egg removal belt.

According to a preferred embodiment of the invention when applying separate laying nests it is provided, that part of the wall of the cages is pivotable, a laying nest adjoining the part of the wall surface which becomes free when pivoting away the said part of the wall.

A simple embodiment, which therewith provides, that generally when removing the laying nests the wall will automatically close again or can be closed very easily, is characterized in that the wall parts are pivotable about a horizontal axis located at their upper side.

It is pointed to it, that the laying nests can protrude wholly or partly into the cages, but also can be located outside the cages, or can protrude partly inside the cages and partly extend themselves outside the cages.

Also it is pointed to it, that the invention with good result can be combined with a device for keeping animals having a service system with food supply gutters located above each other and at one or both sides of which cages are located, the service system and the cages being movable with respect to each other. Such a system has been depicted in the older not published patent application in the name of applicant.

Application of the present invention to a device according to this older proposal can be obtained by providing that the laying nests are mounted to said service system.

A further important advantage of the invention is, that therewith in a very simple manner it is possible to meet the natural inclination of hens to want to scratch. This was practically impossible with grid or netting bottoms of the cages. With the invention it is, however, very well possible to enable the animals to scratch by providing when using a device as depicted above that the excrement disposal belt used as bottom is covered with litter.

Except that herewith the natural desire to scratch has been satisfied, application at predetermined times of fresh litter is an important measure, which in practice reduces the contact of the animals with their excrements.

Still a further possibility to meet the natural desires of laying hens is to provide that the illumination illuminates the laying nests less than the cages. A practical solution hereof exists in that the laying nests are located at the upper side of the cage and that there below an opaque egg removal gutter or belt is located, below which the illumination is placed.

Figure 2:
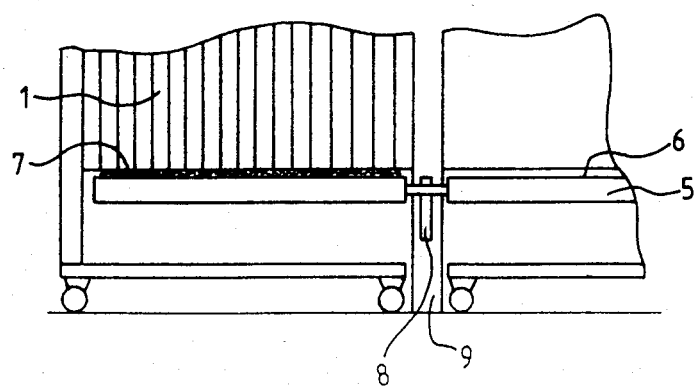

The invention will in the following be elucidated on hand of the drawing, in which:

FIG. 1 schematically shows a cross-section through an embodiment of the invention for laying hens; and FIG. 2 schematically shows an embodiment for broilers.

In FIG. 1 reference 1 indicates a cage having no bottom, mounted to a riding frame, which has vertical uprights 2 and a horizontal girder part 3, which at its upper side has a supporting layer, for instance in the shape of a netting bottom. The riding system can be ridden on wheels 4. To the vertical uprights 2 a number of bottomless cages are mounted by means of suitable constructions having a mutual interspace, which cages each have vertical walls and a ceiling.

Between two such cages 1 rollers 5 are mounted, which protrude from a fixed frame 9 and on which rollers a excrements belt 6 may run, which is provided with litter 7.

In the shown embodiment the rollers 5 are vertically adjustably mounted to the frame 9 by means of an oblong hole connection 8, which frame contains a fodder gutter 10 with a conveyor 11 to convey fodder in a horizontal direction through the butter 10. Embodiments of such fodder gutters have been depicted in the older not published patent application in the name of applicant.

According to the invention the portion 12 of the right wall of cage 1 is pivotable about a pivot axis 13. When the cage 1 and the row laying nests 14 are moved towards each other, the portion 12 pivots upward about the axis 13. The row laying nests 14 is supported by the fixed frame 9, so that the shown mutual position of cage 1 and the row laying nests 14 is realized by riding the riding frame toward the fixed frame 9.

The row laying nests 14 may have a tilting gutter, wherewith the eggs can roll through openings in the bottom on a egg receiving gutter 15 which in a manner known per se is provided with a belt 16 for egg removal.

It is pointed to it, that laying nests per se are known in different embodiments and also per se are no part of the invention.

As appears from the drawing it is possible to use the same row of laying nests 14 for the cage 1 and for a corresponding cage located at the other side of the frame 8, wherewith, however, preferably the laying nests have alternating a closed wall at the side of the one row of cages or that of the other row.

When applying the invention riding frames have a length of preferably 1,20 m, which means that two of them can be located juxtapositioned in a truck. The rollers 5 may have a smaller diameter than shown in the drawing and may even consist of thin bars.

In the position in FIG. 1 the rollers 5 are thereon the excrements disposal belt 6 are practically in their lowest position. This is also the position in which the device is used for laying hens and (with absence of a row of laying nests) for broilers at the end of their growing period.

Therewith the belt 6 may rest on the ceiling of the cage located below it or on the netting grid of the horizontal girder 3. This has the advantage, that a support of the belt is obtained when the load is highest, i.e. when the animals are most heavy. In practice the vertical walls of the cages have a height of for instance 33 cm and the lower edges of the vertical walls may be instance be located 7 cm above the excrements disposal belt. Though this is stretched it will nevertheless sag, but the slit between the lower side of the cages and the excrements disposal belt is insufficient for grown up hens to pass below them.

When on the contrary chickens are brought in, the lower side of the vertical walls of the cage 1 is located nearly immediately above the excrements disposal belt 6.

There may be, when this is necessary or desired, in the longitudinal direction of the riding frames, also perpendicular to the drawing of FIG. 1 or 2, a certain interspace between the riding systems, where then a roll 5 for supporting the disposal belt 6 is located. When the animals are put into the cages 1, these can be ridden to their location, wherewith in case of laying hens the wall portions 12 pivot automatically. When chickens are brought in, the height position of the excrements disposal belt 6 can be lowered in the measure they grow.

When laying hens or fattened broilers are present in the cages, the riding frames can be simply ridden away, wherewith the distance between the lower side of the side walls and the upper side and the ceiling of the cage located below it respectively the netting bottom 3, is sufficiently small to prevent the animals to escape.

When applying the invention for laying hens the case may occur, that these in the beginning do not dispose all their eggs in the laying nests. Removal of these eggs in practice causes all laying hens to use the laying nests.

In FIG. 2 the same references have been used as in FIG. 1. The important difference with FIG. 1 is, that here the frame 9 is narrower which for broilers is desired or sufficient. Further the rollers 5 are here in their highest position in the slits 8 in order to reduce the distance between these rollers and the lowers side of the vertical walls of the cages 1.

In FIG. 1 at 17 an illumination has been shown, which is located very favorable there, because the gutter 15 and the bottom of the laying nests prevent, that the laying nests are illuminated, whereas the fodder in the fodder gutter 10 just is strongly illuminated. Both effects are favorable. Of course for the illumination 17 each suitable type of light source may be used.

It will be clear, that when applying the invention it is not necessary, that use is made of cages, which are rideable with respect to a fixed frame. Also it is not necessary, that the sketched service system with a fodder supply gutter in which a transport chain or suchlike is present, is used when applying the invention.

Further it will be clear, that many variations of the invention are possible. So it is for instance possible, that not the rollers 5, but the cage constructions such as 1 are vertically adjustable, for instance by giving the rideable cages a variable height position. The invention has also the important advantage, that the animals have less contacts with their excrements and can lay their egges in a more hygienic way, when laying hens are considered and that therewith it is possible to meet their need to scratch without inducing therewith a considerable cost increase.

I claim:

1. Device for keeping animals, comprising:
a unitary cage structure, said unitary cage structure comprising a plurality of cages located in a plurality of superposed horizontally extending rows, each row containing a plurality of cages, each cage being provided with vertical sides and a ceiling, only the cages of the lower most row being provided with a bottom, all of said cages having at at least two of the lower edges of said vertical sides, in a direction along a row, a free space, said free space permitting the passage through all of the cages of a row of a horizontally moveable excrement disposal belt;
a frame independent of said unitary cage structure, said frame comprising a plurality of horizontally moveable excrement disposal belts and means for supporting said horizontally moveable excrement disposal belts, said frame being positionable relative to said unitary cage structure, such that said belt supporting means extends into the cages of each of said rows such that a respective belt supported by said frame is positioned near the lower edges of the vertical sides of each of the cages of a respective row of cages of said unitary cage structure, said belt passing through said free spaces of the cages in each respective row.

2. Device according to claim 1, further comprising means for adjusting the height position of the excrements disposal belt with respect to the cages.

3. Device according to claim 1, further comprising a row of laying nests, said laying nests being mounted on said frame.

4. Device according to claim 3, further comprising an egg removal belt.

5. Device according to claim 3, further comprising means mounted on said frame, for opening each of the cages in a horizontal row for permitting passage of said row of laying nests into said unitary cage structure.

6. Device according to claim 1, wherein each horizontally extending row of cages comprises one of a pair of parallel horizontally extending rows of cages, said pair of parallel rows of cages being spaced apart horizontally to form an opening between said two parallel horizontally extending rows of cages, and wherein said belt supporting means comprises horizontally opposed pairs of belt supporting means extending outwardly on opposite sides of said frame, whereby said frame is positionable in said opening such that each of said horizontally extending pairs of belt supporting means extends into the cages of said pair of parallel horizontally extending rows of cages.

7. Device according to claim 6, further comprising a row of laying nests arranged between two of said pairs of parallel horizontally extending rows of cages, a plurality of laying nests being open toward one of said pair of parallel rows of cages enclosed with respect to the other of said pair of parallel rows of cages and the remainder of the laying nests being open towards the other of said pair of parallel rows of cages and closed towards the said one of said pair of parallel rows of cages.

8. Device according to claim 1, further comprising means for permitting movement of said unitary cage structure and frame relative to each other.

9. Device according to claim 8, wherein said frame is fixed and wherein said unitary cage structure is moveable.

10. Device according to claim 1, further comprising means for horizontally moving each of said excrements disposal belts.

11. A unitary cage structure for keeping animals comprising:
a plurality of superposed pairs of parallel, horizontally extending rows of cages, each row containing a plurality of cages;
each of the cages in each row being rectilinear, being open at the lower side, and having vertical sides and a horizontal ceiling, three of said vertical sides having at their lower edges a free space, said free space extending continuously and substantially fully along said three sides;
said cages being oriented such that the free spaces of adjacent cages in a horizontal row are adjacent and form a plurality of openings extending horizontally through the unitary cage structure at the lower side of each of said horizontal rows of cages, and being further oriented such that the third side of each of the cages in a first of each said pairs of parallel horizontal rows of cages is directly opposite, but spaced from, the third side of each of the cages in the second of each of said pairs of said parallel horizontal rows of cages;
the space between said pairs of parallel horizontal rows of cages being sufficient to permit the introduction thereinto and removal therefrom of a separate frame member supporting means for serving said cages.

* * * * *